J. L. GUTWEILER AND F. W. KUBLIN.
TROLLEY.
APPLICATION FILED JUNE 4, 1920.
1,385,678.
Patented July 26, 1921.
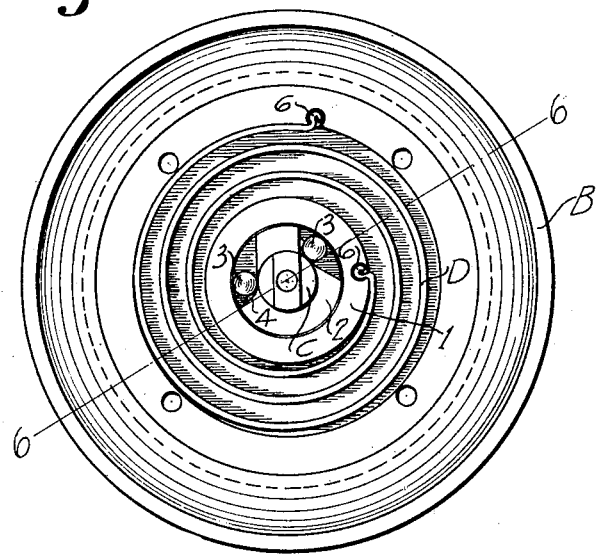
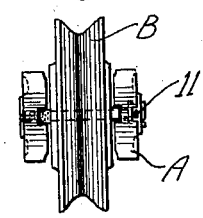
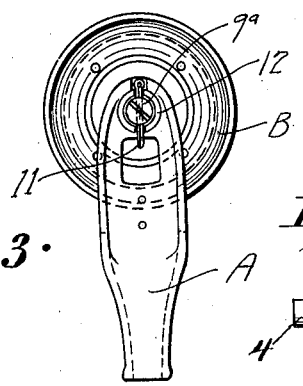
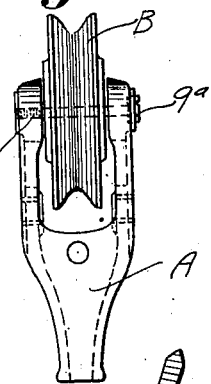
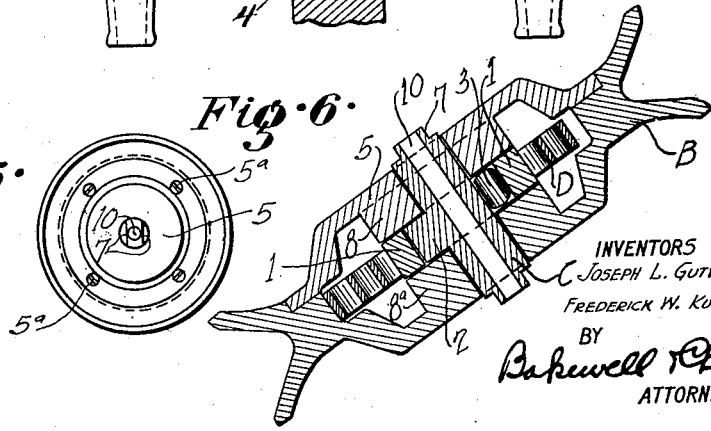
INVENTORS
Joseph L. Gutweiler.
Frederick W. Kublin.
BY
Bakewell & Church
ATTORNEYS.

UNITED STATES PATENT OFFICE.

JOSEPH L. GUTWEILER AND FREDERICK W. KUBLIN, OF ST. LOUIS, MISSOURI.

TROLLEY.

1,385,678.   Specification of Letters Patent.   Patented July 26, 1921.

Application filed June 4, 1920. Serial No. 386,438.

*To all whom it may concern:*

Be it known that we, JOSEPH L. GUTWEILER and FREDERICK W. KUBLIN, citizens of the United States, residing in the city of St. Louis, State of Missouri, have invented a certain new and useful Improvement in Trolleys, of which the following is a full, clear, and exact description, such as will enable others skilled in the art to which it appertains to make and use the same.

This invention relates to trolleys of the type that comprise a wheel mounted in the harp of the trolley pole in such a manner that said wheel normally has a sliding contact with the trolley wire, but is capable of limited resilient movement at intervals, so as to equalize the wear on the grooved portion of said wheel that receives the trolley wire.

One object of our invention is to provide a practicable trolley of the general type referred to which is constructed in a novel manner that insures the wear on the trolley wheel being distributed approximately uniformly over the entire area of the grooved portion of the wheel that receives the trolley wire or conductor on which the wheel travels.

Another object is to provide a trolley of the general type referred to whose coöperating parts are so designed and combined with each other that there is little liability of an arc being created, due to loose joints or open spaces between the coöperating parts of the trolley.

Another object is to provide a trolley of the general type referred to that will successfully withstand the shocks and strains to which it is subjected when in service and which is of such design that there is no liability of the trolley wire becoming jammed between the wheel and the harp in the event the wheel jumps the trolley wire.

And still another object is to provide a trolley of the general type referred to whose wheel can be easily removed from or arranged in operative position in the harp on the trolley pole. Other objects and desirable features of our invention will be hereinafter pointed out.

To this end we have devised a trolley which comprises a wheel having a grooved portion for receiving a trolley wire or other overhead electrical conductor, a harp or forked member mounted on the upper end of a trolley pole, a horizontally-disposed supporting shaft or axle for said wheel carried by said harp and a clutch and a coiled spring arranged between said wheel and shaft in such a manner that said wheel normally has a sliding contact with the trolley wire, but will turn or rotate sufficiently with relation to the harp when the trolley is in service to insure the wear on the grooved portion of the wheel being distributed approximately uniformly over the entire area of said grooved portion.

Figure 1 of the drawings is a side elevational view of the wheel of our improved trolley, showing the detachable side plate of the wheel removed.

Fig. 2 is a top plan view, showing the wheel arranged in operative position in the harp.

Fig. 3 is a side elevational view of the harp with the wheel mounted therein.

Fig. 4 is an end view of said harp and wheel.

Fig. 5 is a side elevational view of the wheel, showing the detachable side plate arranged in operative position.

Fig. 6 is a sectional view, taken on the line 6—6 of Fig. 1; and

Fig. 7 is a detail sectional view, illustrating one of the spring-pressed rollers of the clutch.

Referring to the drawings which illustrate the preferred form of our invention, A designates a harp or forked member that is adapted to be mounted on the upper end of a trolley pole (not shown), B designates a wheel mounted in said harp and provided with a groove for receiving a trolley wire or other electrical conductor (not shown), and C designates a horizontally-disposed shaft or axle mounted in said harp so as to form a support for the wheel B. A coiled spring D and a clutch are arranged between the wheel B and the shaft C, so as to cause said wheel to oscillate forwardly and rearwardly and also gradually change its position about its axis when the trolley is in service. The clutch just referred to is preferably of the roller type and comprises an outer member 1, an inner member 2 rigidly connected to the shaft C and a plurality of rollers 3 arranged in tapered pockets in the inner member 2 of the clutch and acted upon by spring-pressed plungers 4, shown in Figs. 1 and 7, that exert pressure on said rollers in such a manner that said rollers will prevent the outer member 1 of the clutch from turning relatively to the shaft C in clockwise direction, but will permit said outer member to turn freely relatively to the shaft C in the reverse direction or in anti-clockwise direction. The spring D is a relatively heavy, flat coiled spring, preferably formed of a metal that is a good electrical conductor, and arranged in a chamber in the body of the wheel B as shown in Fig. 6, said wheel having a removable portion 5 that forms one wall of said chamber. The spring D is connected at its outer end to the wheel B and at its inner end to the outer member 1 of the roller clutch, and is so arranged that it is normally held under tension by the engagement of the wheel B with the trolley wire, but is free to expand and turn the wheel B in anti-clockwise direction under certain conditions, hereinafter described. The ends of said spring are preferably pivotally connected to the wheel B and to the outer member 1 of the clutch, so as to provide for a slight relative movement between said spring and the parts to which it is connected when said spring is placed under tension and when said spring is released or allowed to expand. In the form of our invention herein illustrated the spring D is provided at its opposite ends with cylindrical portions 6, as shown in Fig. 1, that fit in pockets in the wheel B and in the outer member 1 of the clutch, the outer ends of said pockets being open, so as to permit the cylindrical portions 6 on the spring to be slipped endwise into said pockets. By connecting the spring D to the wheel B and to the clutch member 1 in the manner above described we produce a structure that can be easily assembled and disassembled, and moreover, a structure in which there is little liability of the spring breaking at the points where it is connected to the parts with which it coöperates.

The shaft or axle C is rigidly connected to the harp A in such a manner that there are no loose joints or open spaces between said parts which will result in arcing when the trolley is in use. Said shaft is also mounted in such a manner that the shaft C and the wheel B constitute a unit which can be easily removed from or arranged in operative position in the harp A. As shown in the drawings, the shaft C is provided at its opposite ends with non-circular-shaped portions 7, preferably oblong-shaped portions, that fit in vertically-disposed grooves formed in the inner faces of the side pieces of the harp A, said grooves being open at their upper ends, as shown in Fig. 2. In assembling the device, the shaft C, together with the roller clutch and the spring D, are arranged in operative position in the body portion of the wheel B, and the removable portion 5 of said wheel is then arranged in operative position, as shown in Fig. 6, and secured by screws or other suitable fastening devices 5ª, as shown in Fig. 5. When the parts are so assembled the shaft C is prevented from moving endwise relatively to the wheel C by coöperating portions 8 and 8ª on the removable member 5 and on the body portion of said wheel, respectively, that are arranged at opposite sides of the members 1 and 2 of the roller clutch, as shown in Fig. 6. The wheel B, with the shaft C mounted therein, can then be arranged in operative position in the harp A by slipping the end portions 7 of said shaft downwardly into the grooves in the side pieces of the harp. Thereafter, a screw 9 is slipped endwise through a bore or opening 10 in the shaft C and screwed into one of the side pieces of the harp, as shown in broken lines in Fig. 4, so as to draw the side pieces of the harp together and cause them to bear against the end portions of the shaft C tightly enough to eliminate arcing at these points. The bolt 9 is provided at its outer end with a head 9ª that fits in a socket formed in the outer face of the other side piece of the harp, and holes are formed in said head to receive a cotter key 11 that extends vertically through slots in the annular flange 12 that forms the wall of the socket which receives the head on the screw 9, as shown in Fig. 3.

When the trolley is in service the wheel B is held in snug engagement with the trolley wire by the upward pressure of the trolley pole and by the force or pressure which the spring D exerts on the wheel B in a direction tending to turn said wheel in anti-clockwise direction, or to the left, looking at Fig. 1. When the wheel B passes under the hangers which support the trolley wire the pressure of said wheel on the trolley wire is increased momentarily, due to the increased upward pressure of the trolley pole and the consequent tendency of the wheel to turn in clockwise direction, or to the right, looking at Fig. 1, and thus place the spring D under greater tension. When the wheel B is traveling between two trolley wire hangers the pressure of said wheel on the trolley wire is momentarily decreased, owing to the upward flexing of the trolley wire, thus causing the wheel to turn slightly to the left, or in anti-clockwise direction. When the wheel passes a crossing or a pan, thus momentarily disengaging the wheel from the trolley wire, said wheel will rotate to the left, or in anti-clockwise direction a considerable distance, due to the fact that there is nothing to resist the rotary movement of the wheel in this direction when the wheel is disengaged from the trolley wire. Thereafter, when the wheel B reëngages the trolley wire, the pressure which is exerted on said wheel by its engagement with the trolley wire, causes the wheel B to turn to the right, or in clockwise direction, and thus place the spring D under tension. When the car or vehicle on which the trolley is used is backed up or moved rearwardly, the wheel B will rotate freely to the left, looking at Fig. 1, or in anti-clockwise direction, owing to the fact that the outer member 1 of the roller clutch can rotate freely in anti-clockwise direction without causing the rollers 3 to become jammed between the inner and outer members 1 and 2, respectively, of the clutch.

From the foregoing it will be understood that the wheel B of our improved trolley oscillates forwardly and rearwardly slightly when the trolley is in service, due to the variation in spring pressure of the trolley pole and the flexing of the spring D caused by the downward movement of the trolley pole when the wheel B passes under a trolley wire hanger, bridge or viaduct, the upward movement of the trolley pole after the wheel B passes the trolley wire hanger, bridge or viaduct and the forward jump or rotative movement of the wheel B to the left when the wheel passes over a crossing or pan. The action above described results in a gradual shifting or turning of the wheel B about its axis, thus causing the wear of the grooved portion of said wheel to be distributed approximately uniformly over the entire area of said grooved portion.

The spring D is long enough to permit sufficient rotary movement of the wheel B in clockwise direction to eliminate the possibility of said spring breaking when the wheel B is subjected to a sudden shock or blow such as ensues when the wheel B strikes the trolley wire after passing a crossing or a pan, and the tendency of said spring to break at the points where it is connected to the wheel B and to the outer member 1 of the clutch is materially reduced by pivotally connecting the ends of said spring to said parts. In a trolley of the above construction there is little liability of arcs being created, due to the fact that the shaft C is clamped tightly between the side pieces of the harp A and is electrically connected with the grooved portion of the wheel B by the spring D and the elements of the roller clutch that is interposed between said spring and shaft. The wheel B of our improved trolley can be easily mounted in or removed from the harp A, owing to the fact that the shaft C and the wheel B are combined as a single unit which can be slipped into and out of operative position in the side pieces of the harp and retained in position by a single retaining member, namely, the screw 9 that can be locked securely by a cotter pin. In addition to the desirable features above pointed out our improved trolley is of such design that there is no liability of a trolley wire becoming jammed between the wheel B and the harp A in the event the wheel jumps the trolley wire, this desirable characteristic resulting from the fact that the wheel B is provided at its sides with substantially tapered or frusto-conical-shaped portions that completely fill the space between the side pieces of the harp A.

Having thus described our invention, what we claim as new and desire to secure by Letters Patent, is:

1. A trolley, comprising a harp or supporting member, and a wheel rotatably mounted in said harp in such a manner that it normally has a sliding contact with a trolley wire or conductor with which it coöperates but is capable of turning gradually about its axis when the trolley is in service so as to distribute the wear approximately uniformly over the entire surface of the wheel that bears against the trolley wire.

2. A trolley, comprising a harp or supporting member, a wheel carried by said member and adapted to coöperate with a trolley wire or electrical conductor, and means whereby said wheel will oscillate back and forth when the trolley is in normal operation and will turn gradually about its axis.

3. A trolley, comprising a harp or supporting member, a wheel in said harp that is adapted to coöperate with a trolley wire or electrical conductor, and a coiled spring combined with said wheel for limiting the rotative movement of said wheel in one direction.

4. A trolley, comprising a harp or supporting member, a wheel in said harp that is adapted to coöperate with a trolley wire or electrical conductor, a coiled spring combined with said wheel for resisting the rotative movement of said wheel in one direction, and means for permitting said spring to turn or travel around the axis of rotation of said wheel.

5. A trolley, comprising a wheel that is adapted to coöperate with a trolley wire or electrical conductor, a supporting shaft for said wheel, and a clutch and a spring arranged between said shaft and wheel for controlling the rotative movement of said wheel with relation to said shaft.

6. A trolley, comprising a wheel that is adapted to coöperate with a trolley wire or electrical conductor, a stationary shaft about which said wheel revolves, a coiled spring, and a roller clutch arranged between said wheel and shaft in such a manner that the wheel can turn freely in one direction but has a limited movement in the opposite direction.

7. A trolley, comprising a wheel that is adapted to coöperate with a trolley wire or electrical conductor, a stationary supporting shaft for said wheel, a roller clutch combined with said shaft and comprising an inner member connected to said shaft and an outer member that can turn freely relatively to the shaft in one direction, and a coiled spring connected to the outer member of said clutch and to said wheel for limiting the rotative movement of said wheel in the opposite direction.

8. A trolley, comprising a wheel that is adapted to coöperate with a trolley wire or electrical conductor, a stationary supporting shaft for said wheel, a clutch combined with said shaft and comprising a member that can turn freely in one direction, and a coiled spring arranged between said wheel and clutch member and having its end portions pivotally connected to said parts.

9. A trolley, comprising a wheel that is adapted to coöperate with a trolley wire or electrical conductor, a rigid supporting shaft for said wheel, a flexible connection between said shaft and wheel which restricts the rotative movement of said wheel in one direction, and means for permitting said wheel to turn freely in the opposite direction.

10. A trolley, comprising a wheel that is adapted to coöperate with a trolley wire or electrical conductor, a stationary supporting shaft for said wheel, a coiled spring arranged in a chamber in the body portion of said wheel and connected at one end to said wheel, and a roller clutch combined with said supporting shaft and having an outer member that is connected to the opposite end of said spring.

11. A trolley, comprising a wheel that is adapted to coöperate with a trolley wire or electrical conductor, a stationary supporting shaft for said wheel, a coiled spring arranged in a chamber in the body portion of said wheel and connected at one end to said wheel, and a roller clutch combined with said supporting shaft and having an outer member that is connected to the opposite end of said spring, said spring being provided at its ends with portions that are adapted to be slipped endwise into pockets in said clutch member and in said wheel, and a removable part that forms one side wall of the chamber in the body portion of said wheel that receives said spring.

12. A trolley, comprising a harp or supporting member, and a wheel combined with a supporting shaft to form a single unit that is removably mounted in said harp, said wheel being rotatably mounted on said shaft and said shaft being adapted to be rigidly mounted in said harp.

13. A trolley, comprising a harp or supporting member, a wheel, a supporting shaft on which said wheel is rotatably mounted, said shaft and wheel being combined to form a single unit that is removably mounted in the harp, and integral non-circular portions on said shaft that are adapted to be inserted in openings in said harp which are of such form that said shaft is held against rotation and is prevented from moving relatively to the harp.

14. A trolley, comprising a harp or supporting member, a wheel and a supporting shaft combined as a single unit and adapted to be slipped into operative position between the side pieces of said harp, said wheel being rotatably mounted on said shaft and said shaft being adapted to be rigidly mounted in said harp, and a means for securely clamping the side pieces of said harp to said shaft.

15. A trolley, comprising a harp or supporting member, a wheel, a supporting shaft for said wheel provided at its ends with non-circular shaped portions that are adapted to be inserted in grooves in the side pieces of said harp, and means for drawing the side pieces of said harp together so as to tightly clamp same to said shaft.

16. A trolley, comprising a harp or supporting member having side pieces provided on their inner sides with grooves open at one end, a wheel in said harp, a supporting shaft for said wheel provided at its ends with non-circular-shaped portions that fit in the grooves in the side pieces of said harp, and a clamping device passing through said shaft and combined with the side pieces of said harp in such a manner that it snugly clamps said shaft between the side pieces of said harp.

17. A trolley comprising a harp or supporting member, a wheel arranged in said harp, a stationary supporting shaft for said wheel supported by the side pieces of said harp, and a screw passing through said shaft and having one of its ends screwed into one of the side pieces of said harp so as to clamp the harp tightly against the end portions of said shaft.

18. A harp for trolleys consisting of a substantially forked member whose side pieces are provided on their inner sides with grooves extending lengthwise of said pieces that are adapted to receive the end portions of the supporting shaft for the wheel of the trolley, said grooves being open at the upper ends of said side pieces so as to permit the trolley wheel and the shaft to be slipped as a single unit into the harp, and means for holding said shaft immovable in said harp.

19. A harp for trolleys consisting of a substantially forked member whose side pieces are provided on their inner sides with vertically-disposed grooves that are adapted to receive the end portions of the supporting shaft for the wheel of the trolley, one of said side pieces being provided with a socket for receiving the head of a transversely-disposed retaining screw and the other side piece of the harp having an internally screw-threaded opening for receiving the end of said screw.

20. A trolley, comprising a harp or supporting member, a wheel arranged between the side pieces of said harp, a supporting shaft for said wheel removably mounted in said harp in such a manner that it can not turn with relation to the harp, and a roller clutch and a coiled spring interposed between said wheel and said supporting shaft for permitting said wheel to turn freely in one direction and to have a limited rotative movement in the opposite direction.

JOSEPH L. GUTWEILER.
FREDERICK W. KUBLIN.